United States Patent [19]
Sugden et al.

[11] Patent Number: 5,826,416
[45] Date of Patent: Oct. 27, 1998

[54] LAWN MOWER HAVING A DUAL DISCHARGE SYSTEM

[75] Inventors: David J. Sugden, Horicon; Jeffrey O. Neitzel, Mayville, both of Wis.

[73] Assignee: Scag Power Equipment, Inc., Mayville, Wis.

[21] Appl. No.: 610,585

[22] Filed: Mar. 7, 1996

Related U.S. Application Data

[63] Continuation-in-part of Ser. No. 458,440, Jun. 2, 1995, abandoned.

[51] Int. Cl.⁶ .................................................. A01D 35/22
[52] U.S. Cl. ............................................ 56/320.2; 56/202
[58] Field of Search .................. 56/320.2, 16.6, 56/13.3, 12.8, 192, 202

[56] References Cited

U.S. PATENT DOCUMENTS

| | | |
|---|---|---|
| 2,926,477 | 3/1960 | Bebow . |
| 2,947,571 | 8/1960 | Hagen . |
| 3,357,749 | 12/1967 | Seymour et al. . |
| 3,689,119 | 9/1972 | Weichel . |
| 3,702,051 | 11/1972 | Deines . |
| 3,778,865 | 12/1973 | Schmidt, Jr. et al. . |
| 3,862,539 | 1/1975 | Stevens ................................ 56/13.3 X |
| 3,863,428 | 2/1975 | Baxter . |
| 3,986,463 | 10/1976 | Houston et al. ..................... 56/13.3 X |
| 4,047,365 | 9/1977 | Suggs . |
| 4,078,365 | 3/1978 | Ingalls . |
| 4,156,337 | 5/1979 | Knudson . |
| 4,226,074 | 10/1980 | Mullet et al. .......................... 56/320.2 |
| 4,258,539 | 3/1981 | Pearce et al. .......................... 56/320.2 |
| 4,262,475 | 4/1981 | Takahashi et al. . |
| 4,635,047 | 1/1987 | Fox et al. . |
| 4,660,359 | 4/1987 | Deutsch ................................... 56/13.3 |
| 4,835,951 | 6/1989 | Walker .................................... 56/16.6 |
| 4,881,362 | 11/1989 | Parker et al. ........................ 56/16.6 X |
| 5,033,260 | 7/1991 | Jerry ..................................... 56/202 X |
| 5,070,683 | 12/1991 | Eggenmueller . |
| 5,107,566 | 4/1992 | Schmid ................................. 56/192 X |
| 5,189,868 | 3/1993 | Hill ..................................... 56/16.6 X |

FOREIGN PATENT DOCUMENTS 1090588 12/1980 Canada .

Primary Examiner—Terry Lee Melius
Assistant Examiner—Christopher J. Novosad
Attorney, Agent, or Firm—Michael, Best & Friedrich

[57] ABSTRACT

A lawn mower includes a cutter deck for enclosing a cutter blade, an engine for driving the cutter blade, a discharge assembly coupled to the cutter deck and having first and second outlets, a hopper coupled to the first outlet a discharge chute coupled to the second outlet, and a gate mounted on the discharge assembly and movable between a first position covering the first outlet whereby the discharge assembly communicates with the discharge chute and a second position covering the second outlet whereby the discharge assembly communicates with the hopper.

14 Claims, 5 Drawing Sheets

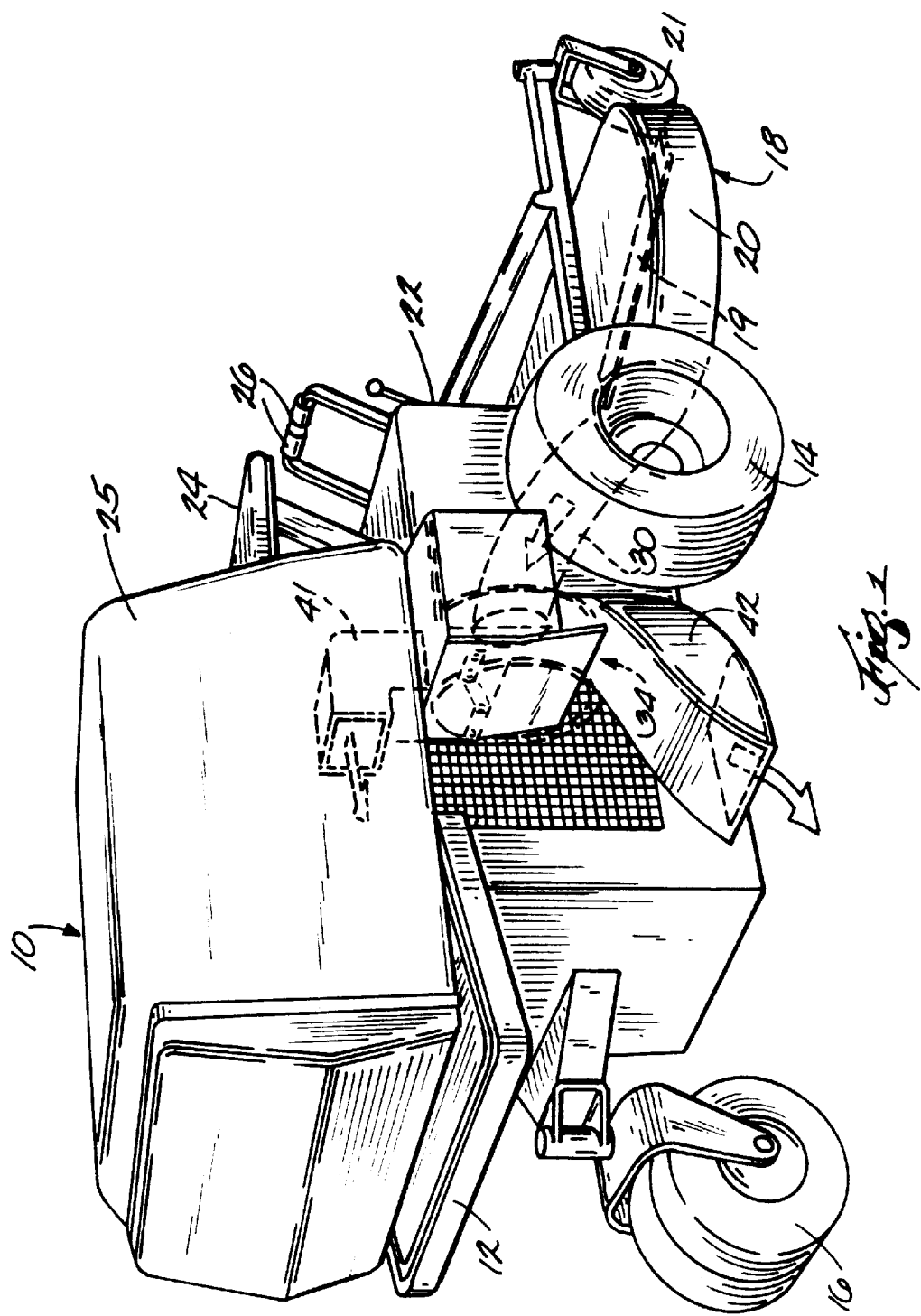

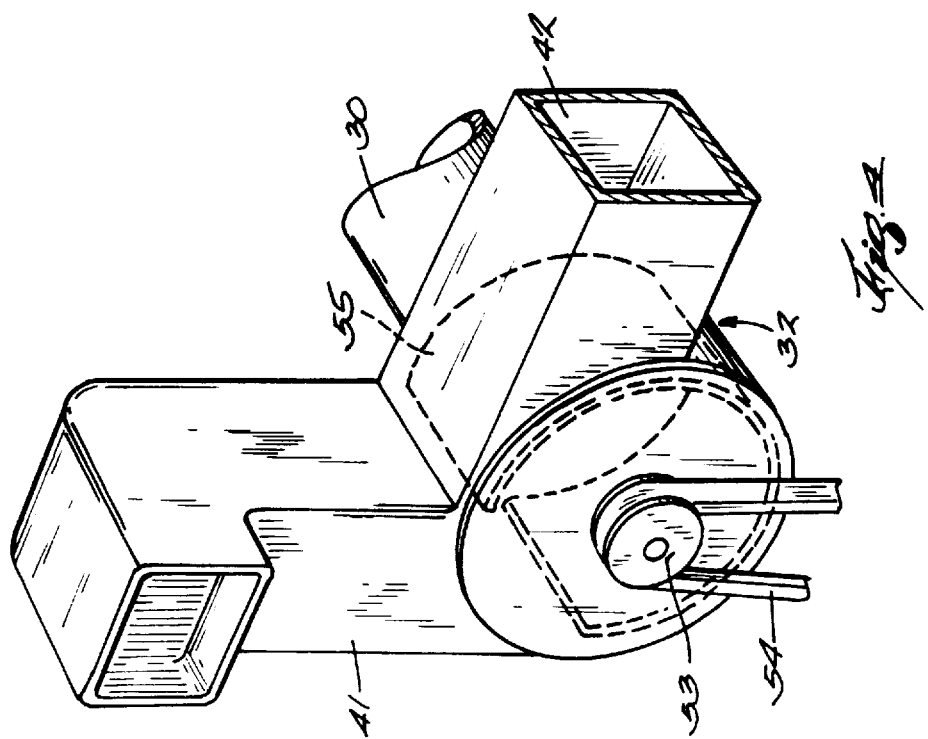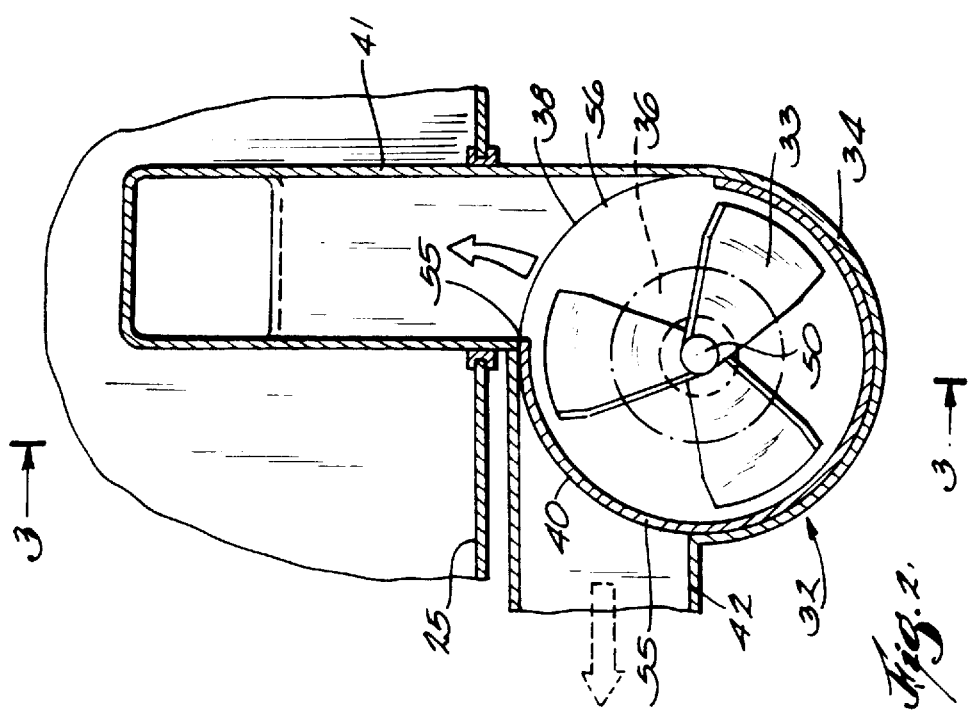

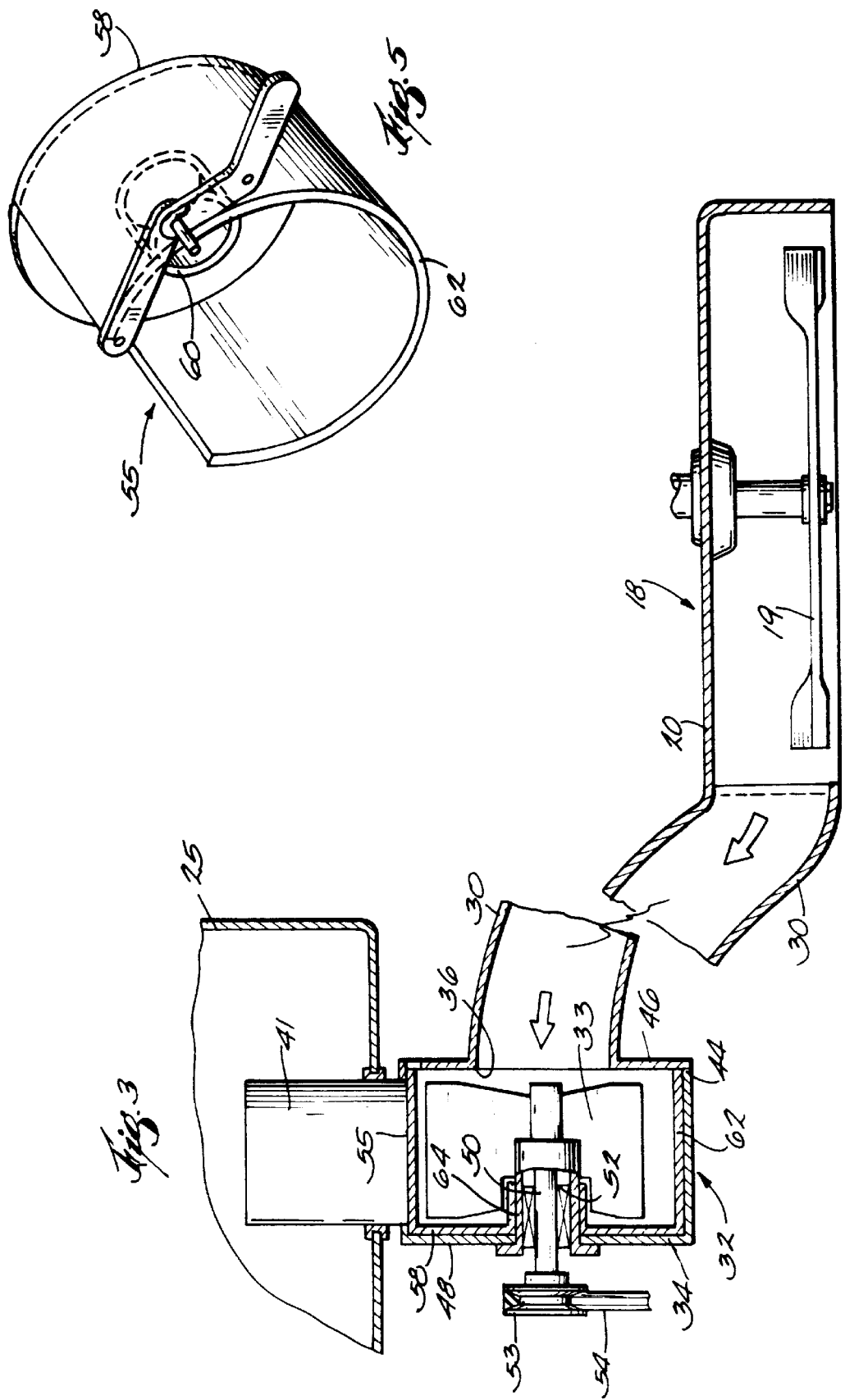

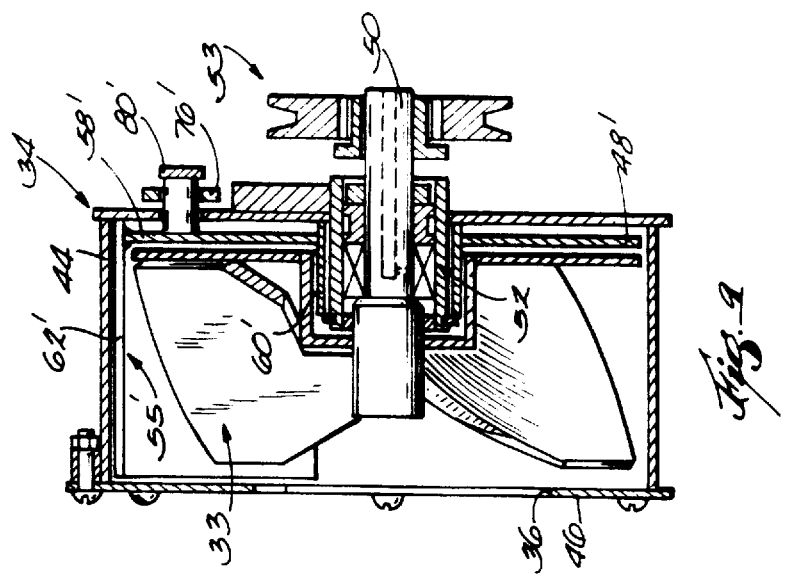
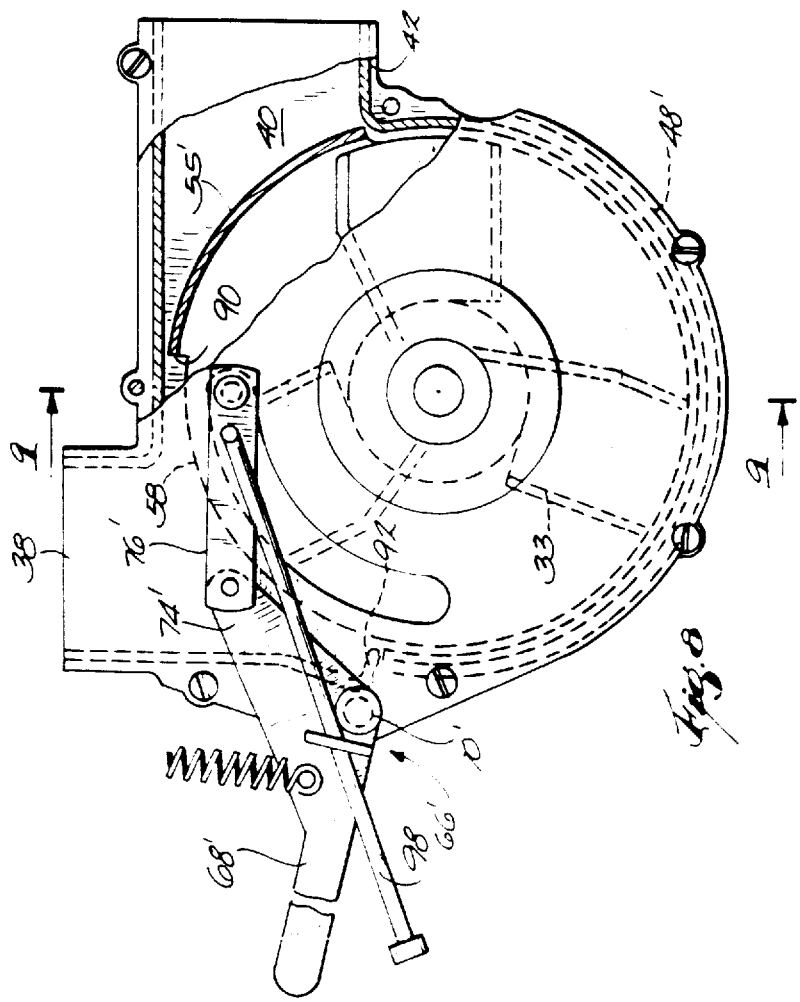

LAWN MOWER HAVING A DUAL DISCHARGE SYSTEM

CROSS REFERENCE TO RELATED APPLICATION

This is a continutation-in-part of application Ser. No. 08/458,440, filed Jun. 2, 1995, now abandoned.

BACKGROUND OF THE INVENTION

This invention relates to lawn mowers and more particularly to a lawn mower discharge assembly.

Self-propelled riding lawn mowers are well known in the art. Such mowers generally include a cutter assembly, an engine for driving the cutter assembly and the mower's drive wheels. Such riding mowers are also often provided with a hopper for collecting clippings and a conduit system for conveying the clippings from the cutter assembly to the hopper. The hopper on such mowers is commonly mounted on a collection deck or hood which includes conduits for communicating the hopper with the cutter assembly.

In some communities, the collection of grass clippings is prohibited because of limitations on dumping sites. As a result, grass clippings are not collected but are discharged from a discharge chute which forms a part of a discharge deck or hood. Prior art mowers had the disadvantage of requiring two decks in order to achieve both collection and discharge operation. In order to convert these prior art mowers from a collection-type to a discharge-type, it was necessary to remove the collection hood and install a discharge hood. As a result, it was necessary for the operator to carry an extra deck or hood and to perform time consuming conversion which necessitated the lifting of heavy components. This was costly and time consuming for commercial operators who are often required to change from collection to discharge when moving from one job site to another.

SUMMARY OF THE INVENTION

It is an object of the invention is to provide a new and improved lawn mower.

Another object of the invention is to provide a new and improved lawn mower, which is capable of both collecting or discharging clippings.

A further object of the invention is to provide a lawn mower which may be rapidly converted from collection to discharge.

Yet another object of the invention is to provide a lawn mower which can be changed from collection to discharge without equipment changeover.

These and other objects and advantages of the present invention will become more apparent from the detailed description thereof taken with the accompanying drawings.

In general terms, the invention comprises a lawn mower having a cutter assembly, an engine coupled to the cutter assembly for driving the same, a discharge assembly coupled to the cutter assembly and having first and second outlets, a hopper coupled to the first outlet for collecting clippings, a discharge chute coupled to the second outlet for discharging clippings, and means mounted on the discharge assembly and movable between a first position for covering the first outlet whereby the discharge chute is coupled to the cutter assembly and the second position for covering the second outlet whereby the clippings are directly conducted to the hopper.

BRIEF DESCRIPTION OF THE DRAWINGS

FIG. 1 is a perspective view showing a lawn mower incorporating the discharge system according to the preferred embodiment of the invention;

FIG. 2 is a side elevational view of a portion of the lawn mower illustrated in FIG. 1;

FIG. 3 is a view taken along lines 3—3 of FIG. 2;

FIG. 4 is a perspective new showing a portion of the lawn mower illustrated in FIG. 1;

FIG. 5 is a perspective view of a portion of the lawn mower shown in FIG. 1;

FIGS. 8 and 9 show an alternate embodiment of the invention.

DETAILED DESCRIPTION OF THE PREFERRED EMBODIMENT

Figure 7:
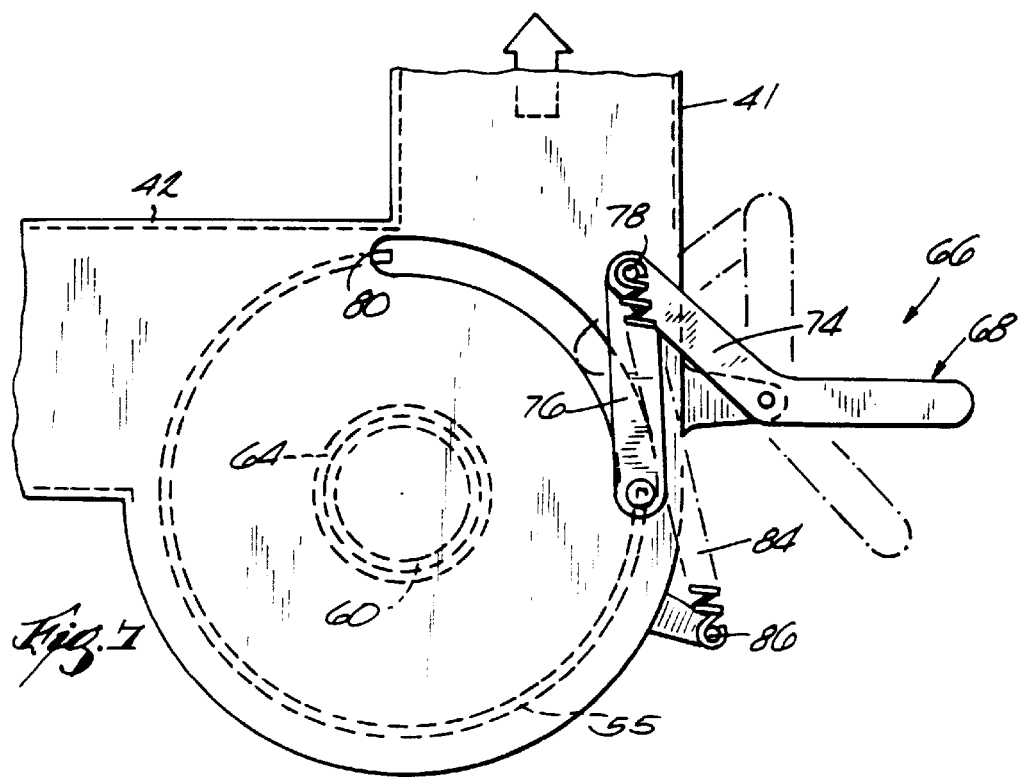
FIG. 7 shows the portion of the lawn mower illustrated in FIG. 6 in an alternate position.

FIG. 1 shows a mower 10 which incorporates a clipping discharge or collection system according to the invention. The mower 10 is otherwise conventional and accordingly, will be described only in general terms. In particular, the mower 10 includes a frame 12 which is supported at its front by a pair of drive wheels 14 at its rear by caster wheels 16. A cutter assembly 18 is mounted on the frame forwardly of the drive wheels 14 and includes at least one cutter blade 19 and a housing 20 supported at its front end by casters 21. A deck or hood 22 is mounted on the frame 12 and encloses an internal combustion engine and transmission (not shown) which power the drive wheels 14 and the cutter blade 19 in a conventional manner. An operator seat 24 is mounted on the deck 22 and behind the operator seat there is a hopper 25 for collecting clippings from the cutter assembly 18 as will be discussed more fully below. The drive wheels 14 may be driven from the engine (not shown) in any conventional manner, such as by a hydraulic system which independently drives each wheel 14. Steering may be accomplished by varying the rotational speed of each drive wheel 14 through the operation of levers 26 in a manner well known in the art.

FIGS. 2–4 schematically illustrate the clipping collection and discharge system according to the invention to include a conduit 30 which connects the cutter assembly 18 to a blower assembly 32 mounted below the hopper 25. The blower assembly 32 includes a fan 33 disposed within a fan housing 34 having an inlet 36 which communicates with the conduit 30 and a pair of outlets 38 and 40. It can be seen FIGS. 2 and 3 that the cutter assembly 18 communicates with the blower assembly 32 solely through the inlet 36 via the conduit 30. Outlet 38 communicates with one end of the first duct 41 whose other end opens into the hopper 25 and the second outlet 40 is connected to one end of a discharged duct 42.

Housing 34 includes an arcuate outer wall 44 and a pair of circular side walls 46 and 48. The inlet 36 comprises a central opening in the side wall 46. The outlets 38 and 40 comprise peripheral openings in the outer wall 44 which are respectively connected to ducts 41 and 42. In order to permit the free flow of clippings from the blower assembly 32 and conduits 41 and 42, one wall of each conduit is tangent with the outer wall 44.

The fan 33 includes a shaft 50 rotatably supported by a bearing 52 mounted on the side wall 48, and may be driven in any suitable manner such as by means of a pulley 53 mounted on shaft 50 and suitably coupled to the engine (not shown) by a belt 54. As seen in FIGS. 2 and 3, the axis of the shaft 50 and the axis of curvature of the arcuate wall 42 are coincident.

A gate 55 is mounted to selectively close one of the outlets 38 or 40 while the other remains open. In particular, the gate 55 is shown in FIG. 5 and includes a circular plate 58 having a coaxial annular pivot sleeve 60. A shell 62 is fixed to the periphery of plate 60 and is arcuate in a plane generally normal to the axis of curvature of the arcuate wall 44 and extends for about 270° or three quadrants. The pivot sleeve 60 is received on a complimentary pivot bushing 64 extending coaxially inwardly from the side wall 48.

The gate 55 is pivoted between its alternate positions by a linkage 66 mounted on the side of housing 34. The linkage 66 includes a hand lever 68 which is pivotally mounted about a fixed pivot axis by a pin 70 extending outwardly from housing 34. Lever 68 includes a first arm 72 positioned to be gripped by the operator and a second arm 74 which extends obliquely relative to the first arm 72. A link 76 is pivotally coupled by a pin 78 to the free end of the second arm 76. The opposite end of link 76 is pivotally coupled to a pin 80 which extends laterally from the plate 58 and through an arcuate slot 82 formed in the housing wall 48. Slot 82 subtends an arc of about 90° around the axis of the pivot bushing 58. A helical spring 84 extends from pin 70 to an anchor 86 on the housing 34 generally below the hand lever 68. As seen in FIGS. 4 and 5, the size of the gate 55r that is its dimensions and the axial and circumstantial directions are such that gate 55 covers outlet 38 in one position and outlet 40 when in a second position.

Figure 6:
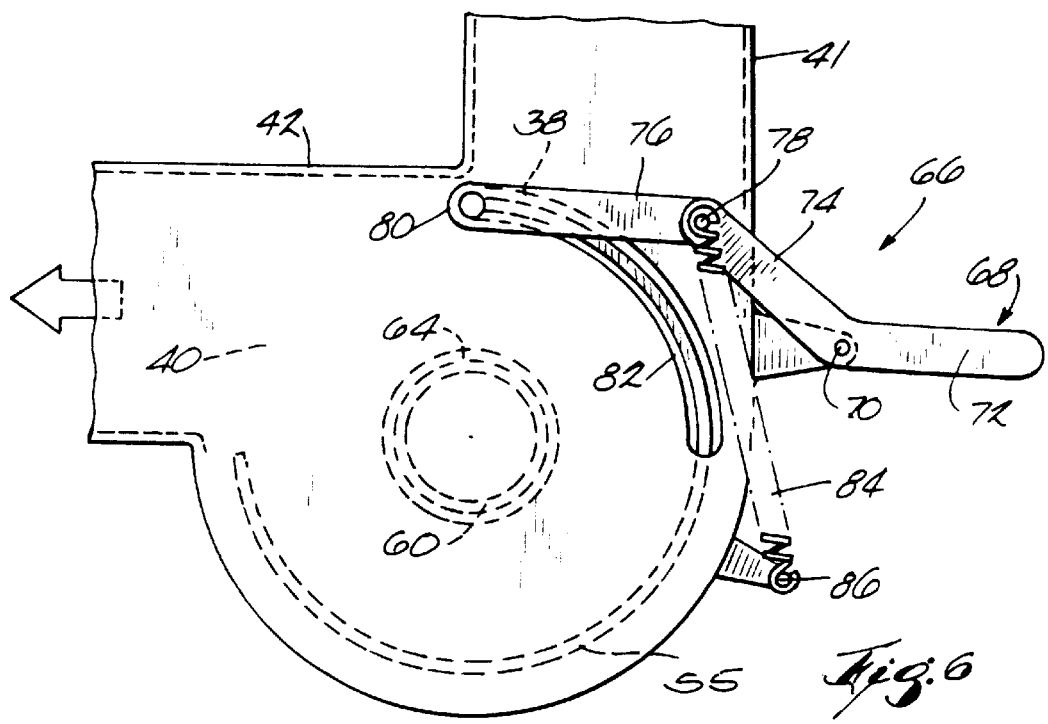
FIG. 6 shows a portion of the lawn mower of FIG. 1 in a first operative mode.

FIG. 6 shows the linkage 66 in a position where the gate covers the opening 38, the opening being 40 uncovered. The spring 86 acting on pin 88 urges the pin downwardly thereby tending to hold the link 86 and hence the gate 55 in this position. Pivotal movement of the hand lever 68 in a clockwise direction moves the pin 78 in a clockwise arc about the axis of pin 70 and against the biasing force of spring 86. As the lever pivots, the link 76 moves toward the right as viewed in FIG. 6 which thereby moving the pin 80 clockwise in slot 82 which pivots the gate 55 about pivot bushing 64. As the pin 80 moves slightly past the approximate center of slot 82, the linkage 66 moves into an overcenter position whereby the spring 86 forces the pin 80 downwardly toward the lower end of slot 82 as pressure on the hand lever 68 is released. This places the linkage 66 in its position shown in FIG. 7 and moves the gate from its position where it closes outlet 38 to a position where it closes outlet 40 and opens outlet 38. When it is desired to close outlet 38 and open outlet 40, the hand lever 68 is pivoted clockwise as viewed in FIG. 7 thereby moving link 82 and pin 80 upwardly. When pin 80 reaches slightly past the approximate midpoint of slot 80, the linkage will again be in an over-center condition so that the release of pressure on the hand lever 68 will permit the spring 86 to move the pin 80 to the upper end of slot 82 as shown in FIG. 6.

If desired, a mechanical latching device may be provided for holding the gate 55 in each of its positions in addition to the biasing force of the spring 84.

Rotation of the fan 33 creates a suction drawing clippings from the cutter assembly 18 through duct 30 to the inlet 36 of blower assembly 32. If it is desired to collect the clippings, the gate 55 is placed in the position shown in FIG. 2. This closes the outlet 40 and opens the outlet 38. On the other hand, if it is desired to discharge the clippings in gate 55 is moved from its position shown in FIG. 2 to its alternate position. This opens outlet 40 and closes outlet 38 so that the clippings are directed to discharge as through conduit 42. It can be seen that the mower according to the invention can be converted from discharge to collection relatively rapidly without the need for tools, a separate deck or a time consuming conversion operation.

FIG. 8 shows an alternate embodiment of the invention in which parts corresponding to those in FIGS. 1–7 are given the same reference numeral, except the gate and the components thereof which are distinguished by a prime ('). It can be send in FIG. 8 that the peripheral extent of the gate member 55' is approximately equal to that required to close the outlets 38 and 40. In addition, the gate 55' is positioned on an extension 90 of the peripheral rim of plate so that it will engage the end of duct 42 to limit rotates in a counter-clockwise direction and a stop 92 formed on the lower end of duct 41 to limit rotation in the clockwise direction. Shortening the gate 55, in this manner eliminates the possibility that clippings can collect between the gate and the housing 34.

In the alternate embodiment of the invention the linkage 66' shown in FIG. 9. Here the pin 70' is mounted on plate 58' and extends outwardly through an arcuate shot 82' in the side wall 48'. The linkage 66' is similar to the linkage 66 shown in FIGS. 6 and 7 except that there is an additional link 98 slidably received in a collar 100 pivotally mounted on link 74'. One end of link 98 is pivotally coupled to link 76' and intermediate its ends. The link 98 can be pushed or pulled during movement of the gate 55' to assist movement of the linkage 66' off of its top dead center position.

While only a few embodiments of the invention has been illustrated and described, it is not intended to be limited thereby, but only by the scope of the appended claims.

It is claimed:

1. A lawn mower including a cutter assembly, an engine for driving the cutter assembly, a discharge assembly including a blower having an inlet coupled to the cutter assembly and having first and second outlets, said blower communicating with said cutter assembly solely through said inlet, said blower being operative to receive grass clippings at said inlet and for discharging the clippings through one of said outlets, a hopper coupled to the first outlet, a discharge chute coupled to the second outlet, means mounted on the discharge assembly and movable between a first position for covering the first outlet and permitting the free flow of clippings from the inlet through the second outlet to the discharge chute and a second position for covering said second outlet wherein said second outlet is closed and the first outlet is open to permit the free flow of clippings from the inlet through the first outlet to the hopper whereby said mower may be rapidly converted from collection of grass clippings in said hopper to dischgrge through said discharge chute without the use of tools.

2. The lawn mower set forth in claim 1 wherein the means for covering the first and second outlets comprising a gate member movable between a first position covering said first outlet and a second position covering the second outlet.

3. The mower set forth in claim 1 wherein each of said outlets defines an opening which is substantially equal in size to that of the other outlet, said means for covering said outlets comprising a gate which is sized about equal to that of said openings.

4. The mower set forth in claim 3 and including linkage means external of said discharge assembly for moving said gate between its first and second positions.

5. The lawn mower set forth in claim 4 wherein the linkage means includes a hand lever pivotally mounted on the discharge assembly, an operating link pivotally coupled at one end to the hand lever and at its other end to the gate, said linkage means having first and second positions, pivotal movement of the hand lever being operative to move said linkage means between its first and second positions, said linkage means being coupled to said gate and operative to move the gate between its first and second positions as said linkage means is moved between its first and second positions.

6. The mower set forth in claim 5 and including biasing means for biasing said linkage means into each of its first and second positions.

7. The mower set forth in claim 6 wherein said linkage means includes biasing means for biasing said linkage-means into each of its first and second positions, and a second link pivotally coupled to the operating link intermediate its ends and slidably mounted on the hand lever to permit the linkage means to be pulled or pushed through a dead center position.

8. A lawn mower including a cutter assembly, an engine for driving the cutter assembly, a hopper, a discharge chute, a discharge assembly including a blower having an inlet connected to the cutter assembly and a first outlet coupled to the hopper and a second outlet coupled to the discharge chute, said blower including a fan and an arcuate housing surrounding said fan and having a pair of circular side walls and an arcuate outer wall, said inlet comprising an opening in one of said side walls, said first and second outlets comprising spaced openings in said outer wall, and an arcuate gate mounted on the discharge assembly, said gate being sized to cover each of said outlets individually and being movable between a first position for covering the first outlet and permitting the free flow of clippings through the second outlet and to said discharge chute and a second position for covering said second outlet wherein said second outlet is closed and the first outlet is open to permit the free flow of clippings to said hopper.

9. The mower set forth in claim 8 wherein each of said outlets defines an opening which is substantially equal in size to that of the other outlet, said arcuate housing having an axis of curvature, said gate having a cross section which is arcuate in a plane generally normal to the axis of curvature of said arcuate housing and being sized about equal to that of said openings.

10. The mower set forth in claim 8 and including linkage means external of said blower for moving said gate between its first and second positions.

11. The mower set forth in claim 10 wherein the blower includes a cylindrical housing portion having an axis, said first and second outlets defining an arc concentric with said axis, mounting means coupled to the gate and pivotally mounted on the cylindrical housing portion for moving the gate in an arcuate path adjacent the arc defined by the outlets.

12. The lawn mower set forth in claim 11 wherein the linkage means includes a hand lever pivotally mounted on the cylindrical housing portion and an operating link pivotally coupled at one end to the hand lever and at its other end to the gate, said linkage having first and second positions, pivotal movement of the hand lever being operative to move said linkage between its first and second positions, said linkage being operative to move the gate between its first and second positions as said linkage moves between its first and second positions.

13. The mower set forth in claim 12 and including biasing means for biasing said linkage into each of its first and second positions.

14. The mower set forth in claim 13 wherein said linkage includes a second link pivotally coupled to the operating link intermediate its ends, and being slidably mounted on the hand lever to permit the linkage to be pulled or pushed through a dead center position.

* * * * *